United States Patent [19]

Autelli

[11] 4,022,512
[45] May 10, 1977

[54] PNEUMATIC CONVEYORS

[75] Inventor: Oscar N. Autelli, Arcadia, Calif.

[73] Assignee: Whitlock, Inc., Farmington, Mich.

[22] Filed: Jan. 26, 1976

[21] Appl. No.: 652,472

[52] U.S. Cl. .............................. 302/26; 137/240; 302/41; 302/52
[51] Int. Cl.² ........................................ B65G 53/04
[58] Field of Search ................. 302/26, 36, 41, 42, 302/52, 53, 51, 57, 24; 222/193, 373; 308/DIG. 1, 4 R; 277/DIG. 5; 137/238, 240

[56] References Cited

UNITED STATES PATENTS

| | | | |
|---|---|---|---|
| 1,038,231 | 9/1912 | Taylor et al. | 137/238 |
| 2,254,472 | 9/1941 | Dahl | 137/240 X |
| 2,315,058 | 3/1943 | Holt et al. | 137/240 X |
| 2,673,125 | 3/1954 | Squire | 302/25 |
| 3,539,223 | 11/1970 | Bovagne | 302/51 X |
| 3,604,758 | 9/1971 | Flain et al. | 302/26 X |
| 3,874,560 | 4/1975 | Powning | 222/193 |

FOREIGN PATENTS OR APPLICATIONS 1,146,519  3/1969  United Kingdom ................. 302/24

Primary Examiner—Evon C. Blunk
Assistant Examiner—James L. Rowland
Attorney, Agent, or Firm—Kinzer, Plyer, Dorn & McEachran

[57] ABSTRACT

Pneumatic conveyor apparatus for conveying particulate material in successive plugs separated by gas-filled spaces, comprising a take-off chamber connecting a supply source to a pressurizing chamber through an internal port, a valve rod and valve closure member for closing the port between the two chambers, a valve actuator connected to an extension of the rod outside the two chambers, a main gas supply for supplying gas under pressure into the top of the pressurizing chamber, and control means for cyclically energizing and de-energizing the valve actuator and the main gas supply, closing the port and supplying gas to the pressurizing chamber and then opening the port with the main gas supply shut off. A cylinder encompasses the valve rod extension, and a continuous flow of gas is maintained through the cylinder into the transfer chamber. The valve closure member has a conical elastomer surface facing a sharp valve seat at the internal port, affording free flow in a self-cleaning valve.

6 Claims, 4 Drawing Figures

PNEUMATIC CONVEYORS

BACKGROUND OF THE INVENTION

This invention relates to pneumatic conveyors for particular material, and especially to pneumatic conveyors suitable for transferring particulate synthetic plastic materials from a storage hopper to an injection molding machine or other processing apparatus.

Pneumatic conveying systems have found general application in conveying powders and other particulate materials over substantial distances. The most commonly employed systems of this kind are high pressure conveyors in which the particulate material is supplied to a conveyor conduit through a rotary valve or other similar isolation device. In the conduit, high pressure air carries the particulate material to its destination. A system of this kind requires high volumes of air at relatively high pressures, especially if the material being conveyed is cohesive enough to exhibit a substantial tendency toward agglomeration or "bridging." For a relatively cohesive material, the pressure requirements may be quite excessive, particularly when it is considered that the pressure required varies as the square of the continuous length of the material in the pipe.

In another pneumatic conveyor system that has found particular application with relatively cohesive materials, the material is divided into discrete plugs separated by spaces filled with air. In one system of this kind, described in Flain et al U.S. Pat. No. 3,604,758, the principal volume of high pressure air for operation of the conveyor is introduced into the top of a sealed storage hopper. A limited additional volume of air is continuously supplied to the hopper at a point near its outlet connection to the conveyor conduit, which is maintained continuously open. The division of the particulate material into discrete plugs is effected by an air knife incorporated in the conveyor conduit at a point near to but spaced from the hopper outlet. A system of this kind can be constructed to work quite satisfactorily with a wide variety of particulate materials, including those having relatively high cohesive or "bridging" characteristics, but it does require rather precise control of the quantities of air introduced at three different points in the system, particularly with respect to control of the air knife.

Another system for dividing the particulate material into discrete plugs, which uses two series-connected valves at the hopper outlet, is described in Powning U.S. Pat. No. 3,874,560. In this system, an electrically controlled mechanical valve releases particulate material from a gravity flow hopper into a valve chamber on a cyclic basis. The outlet of that chamber is another valve, actuated by a pressure differential. When the inlet to the valve chamber is closed, air is introduced into the valve chamber under pressure to open the outlet valve and drive the particulate material into a conveyor conduit. The second valve imposes distinct limitations upon operation of the system and may result in undesirable pressure losses.

SUMMARY OF THE INVENTION

It is a principal object of the present invention to provide a new and improved sequential-plug pneumatic conveyor apparatus operable in conjunction with a gravity flow storage hopper or other unpressurized supply, with the division of the particulate material flowing from the supply into distinct plugs being effected by a single valve.

A specific object of the invention is to provide a new and improved valve structure for control of a plug-type pneumatic conveyor apparatus for particulate material that will afford a long life for the valve with little or no requirement for valve maintenance. A particular feature of the invention is the provision of a continuous pneumatic purge for the control valve of the system that affords positive protection against clogging or jamming of the valve mechanism by the particulate material being conveyed and also aids in the conveyor operation. Another feature of the invention is the utilization of a conical valve closure that permits free flow of the particulate material from the storage hopper toward the conveyor conduit, when the valve is open, and that is inherently self-cleaning in operation.

Another object of the invention is to obtain the maximum propulsion effect from high pressure air introduced into a plug-type pneumatic conveyor apparatus for particulate material by supplying the air to the top of a pressurizing chamber so that the full force of the air is directed toward conveying particulate material from that chamber into a conveyor conduit.

Accordingly, the invention relates to pneumatic conveyor apparatus for supplying particulate material directly from a supply source into a conveyor conduit, in successive plugs separated by intervening gas-filled spaces. The conveyor apparatus comprises a housing defining a material take-off chamber connected by an internal port through a separation wall to a pressurizing chamber, the internal port having a material flow valve seat facing inwardly toward the pressurizing chamber, the housing having an inlet port connecting the supply source to the take-off chamber and an open outlet port connecting the pressurizing chamber directly to the conveyor conduit. A valve rod extends from the pressurizing chamber through the internal port and through the take-off chamber, and has an elongated extension projecting outwardly of the take-off chamber; a valve closure member is mounted on the end of the valve rod in the pressurizing chamber. A linear actuator is connected to the outer end of the valve rod, for actuating the valve rod axially between a closed position in which the valve closure member engages the valve seat to close the internal port against a flow of particulate material, and an open position in which the valve closure member is displaced from the valve seat to open the internal port to a flow of particulate material. Main gas supply means are provided for introducing high pressure gas into the pressurizing chamber, adjacent the internal port; the apparatus includes control means for cyclically energizing the actuator to alternately open and close the internal port, the control means including means to actuate the main gas supply only when the internal port is closed. A cylinder encompasses the valve rod extension, between the actuator and the take-off chamber, defining an annular air space of limited radial dimension encompassing the valve rod extension, the air space having an inner end opening into the take-off chamber and a closed outer end. Auxiliary gas supply means continuously supplies gas under pressure into the outer end of the air space.

BRIEF DESCRIPTION OF THE DRAWINGS

FIG. 3 is a detail view of the main air supply connection to the pressurizing chamber of the apparatus of FIGS. 1 and 2, taken approximately along line 3—3 in FIG. 2.

DESCRIPTION OF THE PREFERRED EMBODIMENT

Figure 1:
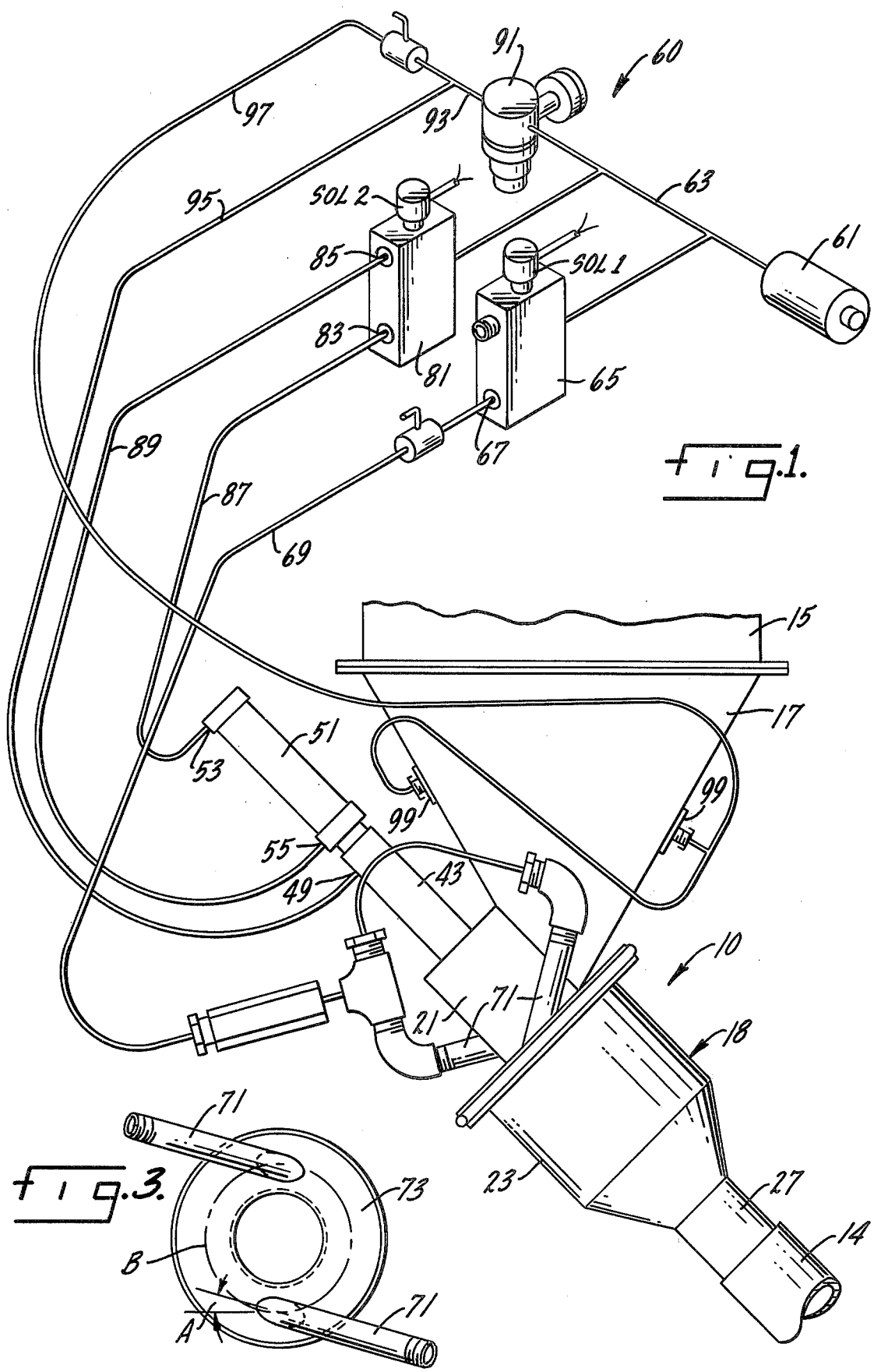
FIG. 1 is an elevation view of conveyor apparatus constructed in accordance with one embodiment of the present invention, including a schematic illustration of the pneumatic control elements for that apparatus.
Figure 2:
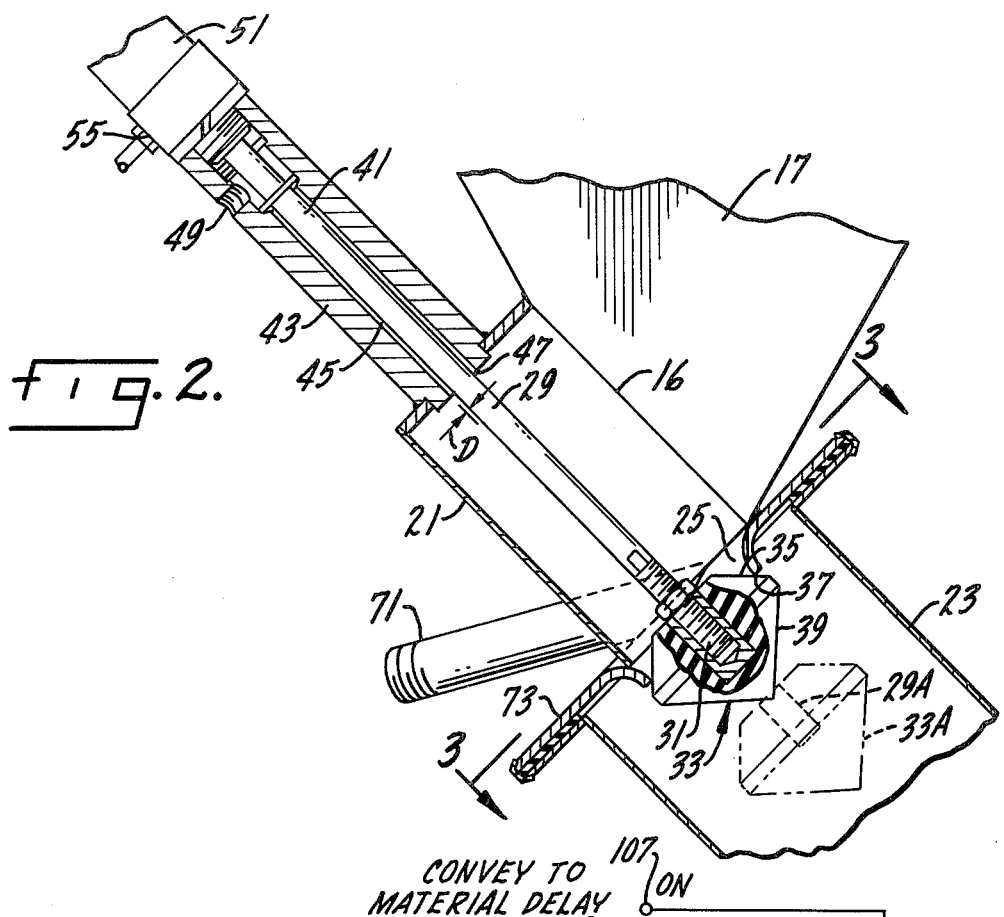
FIG. 2 is a sectional elevation view of the conveyor apparatus of FIG. 1.

FIGS. 1 and 2 illustrate a pneumatic conveyor apparatus 10 or conveying particulate material directly from a storage hopper 15 into a conveyor conduit 14 in successive plugs separated by intervening gas-filled spaces. The bottom portion of hopper 15 comprises a generally conical hopper discharge compartment 17. A housing 18 is mounted on the lower end of the hopper discharge compartment 17.

Housing 18 defines two interconnected chambers 21 and 23. The upper chamber 21 is a material take-off chamber having an open inlet port 16 connected to the outlet of the hopper discharge compartment 17. An internal port 25 within housing 18 connects the take-off chamber 21 to the lower chamber 23, referred to hereinafter as a pressurizing chamber. An open outlet port 27 connects chamber 23 to conduit 14.

A valve rod 29 extends through the upper part of housing 18. The lower end 31 of valve rod 29 projects through port 25 into chamber 23; a valve closure member 33 is mounted upon this end of valve rod 29. The valve closure member 33 is preferably formed of an elastomer material, usually a relatively hard rubber or synthetic elastomer. The upper surface 35 of member 33 is of conical configuration and engages a sharp annular valve seat 37 circumscribing the internal port 25. The lower surface 39 of valve closure member 33 is preferably also of conical configuration.

Valve rod 29 extends completely through take-off chamber 21 and has an elongated extension 41 projecting upwardly and outwardly of the take-off chamber. A cylinder 43 is affixed to housing 18, defining an annular air space 45 of limited radial dimension D that encompasses the valve rod extension 41. Air space 45 has an inner end opening 47 into the take-off chamber 21; the outer end of air space 45 is closed except for an air inlet 49.

A linear actuator 51 is mounted on the outer end of cylinder 43 and is connected to the outer end of the extension 41 of valve rod 29. Actuator 51 may comprise any suitable device for driving valve rod 29 axially between the closed position shown in solid lines in FIG. 2, and the open position illustrated by the phantom outlines 29A and 33A. In the closed position for valve rod 29, the upper conical surface 35 of valve closure member 33 is engaged with the valve seat 37 of internal port 25, closing the port. In the open position 29A for rod 29, the valve closure member 33 is at the position 33A substantially displaced from valve seat 37, so that port 25 is open.

In the illustrated construction, actuator 51 comprises a conventional pneumatic cylinder having upper and lower ports 53 and 55 respectively. However, a hydraulic actuator or an electrical actuator could be utilized if desired.

The pneumatic control system 60 for conveyor apparatus 10, illustrated in FIG. 1, comprises a compressor 61 which feeds a main supply line 63; appropriate pressure regulator and filter means may be provided but have not been illustrated. A solenoid-actuated valve 65 connected to line 63 affords a part of a main gas supply means for introducing gas under pressure into the pressurizing chamber 23. Thus, the outlet port 67 of valve 65 is connected to a pneumatic line 69 that is in turn connected to two gas input conduits 71 mounted on the wall 73 that separates chambers 21 and 23. Wall 73 forms the top wall of the pressurizing chamber, above valve seat 37. As shown in FIGS. 1-3, the gas inlet conduits 71 are each disposed at an acute angle to the chamber separation wall 73 and are disposed opposite each other on a circle B encircling port 25 in an alignment such that air entering chamber 23 enters at an acute angle A (FIG. 3) relative to a true tangential path. Typically, angle A may be of the order of 15 degrees.

The upper and lower ports 53 and 55 of pneumatic actuator 51 are connected to first and second outlet ports 83 and 85 of another solenoid-operated control valve 81 by two pneumatic lines 87 and 89, respectively. Valve 81 has an input connection from the main air supply line 63.

A low pressure regulator 91 connected to the main air supply line 63 affords an output of air at a lower pressure in a further supply line 93. This auxiliary supply line 93 is connected by an air conduit 95 to the air inlet 49 at the top of cylinder 43. Another line 97 connects the auxiliary air supply 93 to two air pads 99 on the conical discharge compartment 17 for hopper 15. Each of the air pads affords a multiplicity of small openings into the discharge compartment of the hopper, the air introduced at this point in the hopper being utilized to preclude undue bridging of the particulate material within the output compartment 17 of the hopper.

Figure 4:
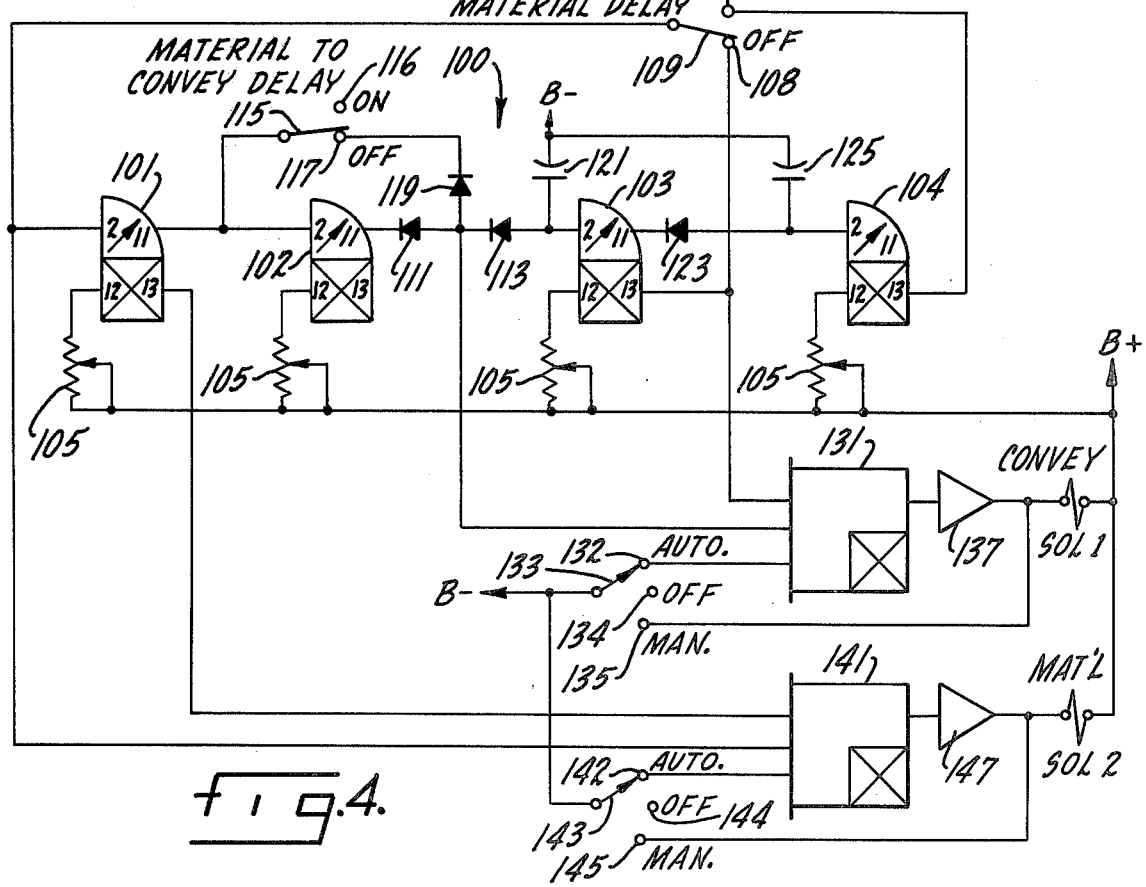
FIG. 4 is a schematic diagram of a suitable electrical control for the pneumatic conveyor apparatus of FIGS. 1-3.

FIG. 4 illustrates a typical electrical control circuit 100 that may be utilized for control of the solenoids SOL1 and SOL2 that actuate the conveyor valve 65 and the material control valve 81 in the pneumatic system 60 of FIG. 1. Circuit 100 includes four timers 101, 102, 103 and 104. Each of these timers has an input terminal 2, a calibration terminal 12, and two output terminals 11 and 13. The timer produces a negative output at its terminal 11 only after a negative input has been present at the input terminal 2 for a pre-set time, determined by the setting of a potentiometer 105 connecting the calibration terminal 12 to a B+ supply. A negative output appears at the output terminal 13 of the timer whenever there is no negative output at terminal 11. Each of the timers resets within a given time interval, usually about 50 milliseconds, after removal of the negative input at its input terminal 2. The precision timers manufactured by Design Products Corp. of Troy, Mich. as Versaframe Series 55 Timers are suitable for use as the timers 101-104 in the electrical control circuit 100.

The output terminal 13 of timer 104 is connected to the ON terminal 107 of a single-pole double-throw convey-to-material delay switch 109. The OFF terminal 108 of switch 109 is connected to the output terminal 13 of timer 103. The common terminal of switch 109 is connected to the input terminal 2 of timer 101.

The output terminal 11 of timer 101 is connected to the input terminal 2 of timer 102. The output terminal 11 of timer 102 is connected, through two series diodes 111 and 113, to the input terminal 2 of timer 103. A single-pole double-throw material-to-convey delay switch 115 has its common terminal connected to the output terminal 11 of timer 101. The ON terminal 116 of switch 115 is left open-circuited. The OFF terminal 117 of switch 115 is connected through a diode 119 to the common terminal of the two diodes 111 and 113.

The input terminal 2 of timer 103 is connected through a capacitor 121 to a B− supply. The output terminal 11 of timer 103 is connected through a diode 123 to the input terminal 2 of timer 104. A capacitor 125 is connected from the input terminal 2 of timer 104 to the B− supply.

Control circuit 100 (FIG. 4) includes a three-input AND gate 131 having one input connected to the output terminal 11 of timer 102 through the diode 111. A second input to gate 131 is taken from the output terminal 13 of timer 103. The third input to gate 131 is derived from the "AUTO" terminal 132 of a single-pole three-position switch 133. The OFF terminal 134 of switch 133 is left open-circuited. The "MANUAL" terminal 135 of the switch is connected to one terminal of the solenoid SOL1 that controls the conveyor valve 65 (FIG. 1). The other terminal of the solenoid is connected to the B+ supply. The common terminal of the switch 133 is connected to the B− supply. The output of gate 131 is connected to the same terminal of the solenoid SOL1 as switch terminal 135 by a driver amplifier 137.

A second three-input AND gate 141 is incorporated in the electrical control system 100. The output of gate 141 is connected through a driver amplifier 147 to one terminal of the solenoid SOL2 that controls pneumatic valve 81 (FIG. 1). The other terminal of the solenoid is connected to the B+ supply.

One input to gate 141 is taken from the output terminal 13 of timer 101. A second input to gate 141 is derived from the common terminal of switch 109. The third input to gate 141 is taken from the AUTO terminal 142 of a single-pole three-position switch 143. The OFF terminal 144 of switch 143 is left open circuited and the MANUAL terminal 145 of the switch is connected to solenoid SOL2. The common terminal of switch 143 is connected to the B− supply.

In considering the operation of the pneumatic conveyor apparatus 10, as controlled by the pneumatic control 60 and the electrical control system 100, it may first be assumed that the delay switches 109 and 115 are in their respective OFF positions and the control switches 133 and 143 are in their AUTO positions as shown in FIG. 4. Under these conditions, when the system is started in operation by actuation of a suitable power supply switch (not shown) to energize circuit 100, timers 101 and 103 start from a reset condition. The condition of the timers 102 and 104 is immaterial because timer 102 is bypassed through switch 115 and the output of timer 104 is open-circuited at switch 109. It should be noted that in the logic of control system 100, a negative potential is a "true" value.

On start up, at time $T_0$, the output terminals 13 of timers 101 and 103 afford two negative inputs to AND gate 141. A third negative input is supplied to the gate through switch 143. Accordingly, gate 141 is open, solenoid SOL2 is energized, and valve 81 (FIG. 1) supplies air under pressure to port 53 of actuator 51, venting port 55 to the atmosphere. As a consequence, actuator 51 drives valve rod 29 downwardly to its position 29A, moving the valve closure member 33 clear of valve seat 37 at position 33A and opening the internal port 25 between take-off chamber 21 and pressurizing chamber 23. Accordingly, particulate material that has previously collected in chamber 21 by gravity flow from hopper 11 flows into pressurizing chamber 23 through port 25. Limited assistance for this flow is afforded by the continuous stream of air, under moderate pressure, that enters cylinder 43 through inlet 49 and flows through space 45 into chamber 21.

After the preset time $T_1$ for timer 101 (FIG. 4) has expired, timer 101 times out, producing a negative or true output signal at its terminal 11 and interrupting the negative output signal at its terminal 13. The interruption of the true signal at output terminal 13 of timer 101 cuts off the enabling signal to one input of AND gate 141, so that solenoid SOL2 is de-energized. As a consequence, pneumatic valve 81 (FIG. 1) is actuated to its alternate operating condition and supplies air under pressure to port 55 of cylinder 51 while venting port 53 to the atmosphere. Accordingly, valve rod 29 is driven back to its closed condition, in which valve closure member 33 engages valve seat 37 and closes the internal port 25 between the chambers 21 and 23.

At time $T_1$, when the timer 101 (FIG. 4) has timed out, the negative or true output from terminal 11 of timer 101 is supplied to the input terminal 2 of timer 103 through switch 115, diode 119, and diode 113. The same negative signal is supplied to AND gate 131 through switch 115 and diode 119. The three inputs to gate 131 are now all true, opening the gate and energizing solenoid SOL1.

The energization of the solenoid SOL1 actuates pneumatic valve 65 (FIG. 1) to supply high pressure air to the inlet conduits 71 that open into the top of pressurizing chamber 23. The high pressure air entering the top of the pressurizing chamber drives the particulate material previously deposited in chamber 23 through the outlet port 27 and into the conveyor conduit 14.

After a further pre-set time interval $T_3$, timer 103 (FIG. 4) times out. As a consequence, the negative true signal at output terminal 13 of timer 103 is interrupted. This removes one of the enabling signals to gate 131, the gate closes, and solenoid SOL1 is de-energized. At this point, therefore, both of the gates 131 and 141 are closed, the two solenoids SOL1 and SOL2 are both de-energized, the internal port 25 of the conveyor apparatus is closed, and the main air supply to pressurizing chamber 23 is cut off.

With the negative input signal no longer supplied to input terminal 2 of timer 101 from timer 103, timer 101 resets. This cuts off the negative input signal to timer 103, which in turn resets. With timers 101 and 103 both reset, the original starting conditions for time $T_0$ are re-established and a new cycle is initiated, again energizing solenoid SOL2. Thus, valve rod 29 is again driven to its open position with the valve closure member 33A displaced from valve seat 37, opening the internal port 25 to discharge a new slug of material into pressurizing chamber 23. In this manner, individual slugs of particulate material are discharged into conveyor conduit 14, with successive slugs separated by intervening air-filled spaces, the air pressure behind succeeding slugs moving the particulate material through the conveyor conduit to a molding machine or other end use location.

As noted above, air is continuously supplied under pressure through port 49 into the air space 45 between the valve rod extension 41 and the cylinder 43 (FIG. 2). This air serves a dual purpose. As previously stated, it provides a minor impetus to move particulate material collected in take-off chamber 21 into pressurizing chamber 23. More importantly, the continuous air flow through sapce 45 prevents the particulate material from jamming valve rod 29 in the course of operation of the valve rod. That is, the air flow through space 45 continuously cleans the valve rod extension 41 and prevents any accumulation of particulate material in a position to clog or jam the valve rod. This is of substantial importance in maintaining the material flow valve in operation, especially when fine particulte material is being conveyed, material which may be of a rather abrasive nature.

On the other hand, the conical valve closure surface 35 is also of material assistance in providing for long life of the material flow valve without undue maintenance requirements. Each time valve closure member 33 returns to its closed postion, shown in solid lines in FIG. 2, the sharp valve seat 37 scrapes particulate material from the conical surface 35, keeping that surface clean so that the valve closes effectively in each operation. A hard elastomer material for the valve closure material allows a better cleaning action than would a metal member and also provides extended life. Furthermore, the conical configuration for the surface 35 prevents the valve closure member from undue interference with the flow of particulate material from take-off chamber 21 into pressurizing chamber 23, as contrasted with a flat valve closure surface which would tend to interrupt the flow of particulate material and cause bridging of that material within the internal port 25.

The input arrangement for the main air supply into pressurizing chamber 23, through the input conduits 71 at the top of the fluidizing chamber, realizes maximum effect from the high pressure air in conveying the particulate material into and through the conveyor conduit 14. The efficiency of the conveying operation is materially improved as compared with the introduction of the main air supply to the sides of the pressurizing chamber as in previously known devices.

Table I, below, tabulates the timing and operating conditions for the conveyor apparatus with the timers 102 and 104 of control system 100 effectively bypassed.

TABLE I

Switches 109, 115 in OFF positions

|  | $T_o$ (Start-Reset) | $T_1$ (Timer 101 Timed Out) | $T_{3=}$ (Timer 103 Timed Out) |
|---|---|---|---|
| Gate 131 | Closed | Open | Closed |
| Gate 141 | Closed | Closed | Closed |

TABLE I-continued

Switches 109, 115 in OFF positions

|  | $T_o$ (Start-Reset) | $T_1$ (Timer 101 Timed Out) | $T_{3=}$ (Timer 103 Timed Out) |
|---|---|---|---|
| SOL 1 | De-energized | Energized | De-energized |
| SOL 2 | Energized | De-energized | De-energized |
| Material Flow Valve | Open | Closed | Closed |
| Conveyor Air Supply | Off | On | Off |

*Timers 101, 103 reset immediately after timer 103 times out, returning control to $T_o$ condition.

In many instances, it may be desirable to afford some delay interval between the closing of the particulate material flow valve effected by de-energization of solenoid SOL 2 and the initiation of the flow of high pressure air into pressurizing chamber 23 that is effected by energization of solenoid SOL 1. This is the purpose of timer 102. By actuating the material-to-convey delay switch 115 to its ON position, timer 102 is effectively inserted in the operating circuit between timers 101 and 103. The set time for timer 102 then becomes the delay interval between closing of the material flow valve and initiation of the flow of high pressure air into pressurizing chamber 23.

It may also be desirable to afford a delay interval, greater than the reset time for the timers, between the time at which the high pressure air flow to chamber 23 is interrupted by de-energization of solenoid SOL 1 and the time that the material flow valve is opened by energizing solenoid SOL 2. This is the purpose of timer 104, which is effectively incorporated in the operating circuit 100 by actuation of switch 109 to its ON condition. The delay interval between the "convey" operation and the opening of the material flow valve is then established as the preset timing interval for timer 104.

The sequence and timing of the control operation, using the delay timers 102 and 104, is set forth below in Table II.

TABLE II

Switches 109,115 in ON positions.

|  | $T_o$ (Start-Reset) | $T_1$ (Timer 101 Timed Out) | $T_2$ (Timer 102 Timed Out) | $T_3$ (Timer 103 Timed Out) | $T_4$ * (Timer 104 Timed Out) |
|---|---|---|---|---|---|
| Gate 131 | Closed | Closed | Open | Closed | Closed |
| Gate 141 | Open | Closed | Closed | Closed | Closed |
| SOL 1 | De-energized | De-energized | Energized | De-energized | De-energized |
| SOL 2 | Energized | De-energized | De-energized | De-energized | De-energized |
| Material Flow Valve | Open | Closed | Closed | Closed | Closed |
| Conveyor Air Supply | OFF | OFF | ON | OFF | OFF |

*All timers reset immediately after timer 104 times out, returning control to $T_o$ condition.

It will be recognized that it is not essential to use both of the delays afforded by the switches 109 and 115; either one of the two delay intervals can be provided as desired.

From the foregoing description, it will be apparent that the pneumatic conveyor apparatus of the invention supplies particulate material directly from the gravity flow storage hopper 15 to the conveyor conduit 14 in a series of successive plugs separated from each other by intervening air-filled spaces. Of course, some gas other than air can be employed if the particulate material is subject to contamination by contact with the air. The system is quite suited to use with another gas, provided suitable arrangements are made for venting valve 81.

It may sometimes be desirable to open the flow control valve at port 25, as for cleaning during a changeover from one particulate material to another. This can readily be accomplished, using the control circuit 100 of FIG. 4, by actuating selector switch 143 to its manual position to energize the material solenoid SOL 2 directly. Similarly, at the close of a day's operation, it may be desirable to energize the conveyor air solenoid SOL 1 continuously for a period of time to clear all of the particulate material from conduit 14. This is effected by energizing the solenoid SOL 1 directly through switch 133, closing the switch on its manual position. The OFF positions for the switches 133 and 143 permit independent energization of solenoids SOL 1 and SOL 2.

Of course, system 10 can be used to convey particulate material other than plastics, such as cement, grain, etc. Further, although the supply for the system is shown as a storage hopper 15 of moderate size, the system is readily adaptable to a wide variety of material sources, including large storage silos and processing machinery such as dust collectors, screw feeders, classifiers, and the like.

I claim:

1. Pneumatic conveyor apparatus for supplying particulate material directly from a supply source into a conveyor conduit, in successive plugs separated by intervening gas-filled spaces, comprising:

a housing defining a material take-off chamber connected by an internal port through a separation wall to a pressurizing chamber, the internal port having a material flow valve seat facing inwardly toward the pressurizing chamber, the housing having an inlet port connecting the supply source to the take-off chamber and an open outlet port connecting the pressurizing chamber directly to the conveyor conduit;

a valve rod extending from the pressurizing chamber through the internal port and through the take-off chamber and having an elongated extension projecting outwardly of the take-off chamber;

a valve closure member mounted on the end of the valve rod in the pressurizing chamber;

a linear actuator, connected to the outer end of the valve rod, for actuating the valve rod axially between a closed position in which the valve closure member engages the valve seat to close the internal port against a flow of particulate material, and an open position in which the valve closure member, is displaced from the valve set to open the internal port to a flow of particulate material;

main gas supply means for introducing high pressure gas into the pressurizing chamber, adjacent the internal port;

control means for cyclically energizing the actuator to alternately open and close the internal port, the control means including means to actuate the main gas supply only when the internal port is closed;

a cylinder encompassing the valve rod extension, between the actuator and the take-off chamber, defining an annular air space of limited radial dimension encompassing the valve rod extension, the air space having an inner end opening into the take-off chamber and a closed outer end;

and auxiliary gas supply means, employing the same gas as the main gas supply means, for continuously supplying gas under pressure into the outer end of the air space, to preclude accumulation of particulate material in the air space and to aid the flow of particulate material through the internal port into the pressurizing chamber.

2. Pneumatic conveyor apparatus according to claim 1 in which the control means includes means to delay actuation of the main gas supply, in each cycle of operation, for a predetermined interval following energization of the actuator to close the internal port.

3. Pneumatic conveyor apparatus according to claim 1 in which the control means includes means to delay energization of the actuator to open the internal port, in each cycle of operation, for a predetermined interval following shut off of the main gas supply.

4. Pneumatic conveyor apparatus according to claim 1 in which the main gas supply means comprises at least two gas inlet conduits connected to the top of the pressurizing chamber, above the material flow valve seat.

5. Pneumatic conveyor apparatus according to claim 4 in which the gas inlet conduits are each located on a circle enclosing the internal port, inclined at an acute angle to the separation wall and inclined inwardly at an acute angle to a tangent to the location circle.

6. Pneumatic conveyor apparatus according to claim 1 in which the valve closure member includes a conical valve closure surface of relatively hard elastomer material facing the material flow valve seat, and the valve seat engages the valve closure surface in annular line contact.

* * * * *